Sept. 4, 1956  E. G. EGGE ET AL  2,761,193
RIBBON RUBBER THREAD SPLITTER
Filed Sept. 21, 1951  3 Sheets-Sheet 1
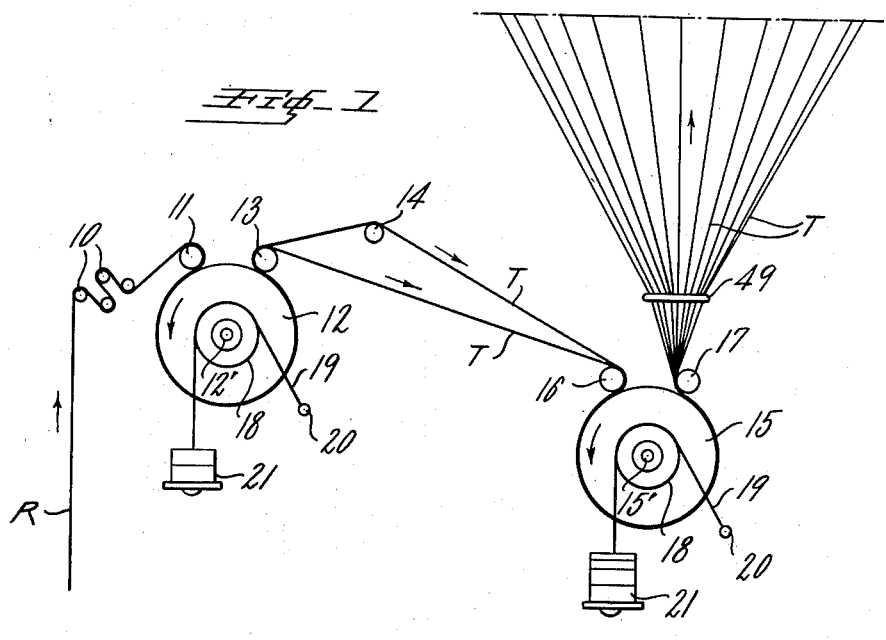
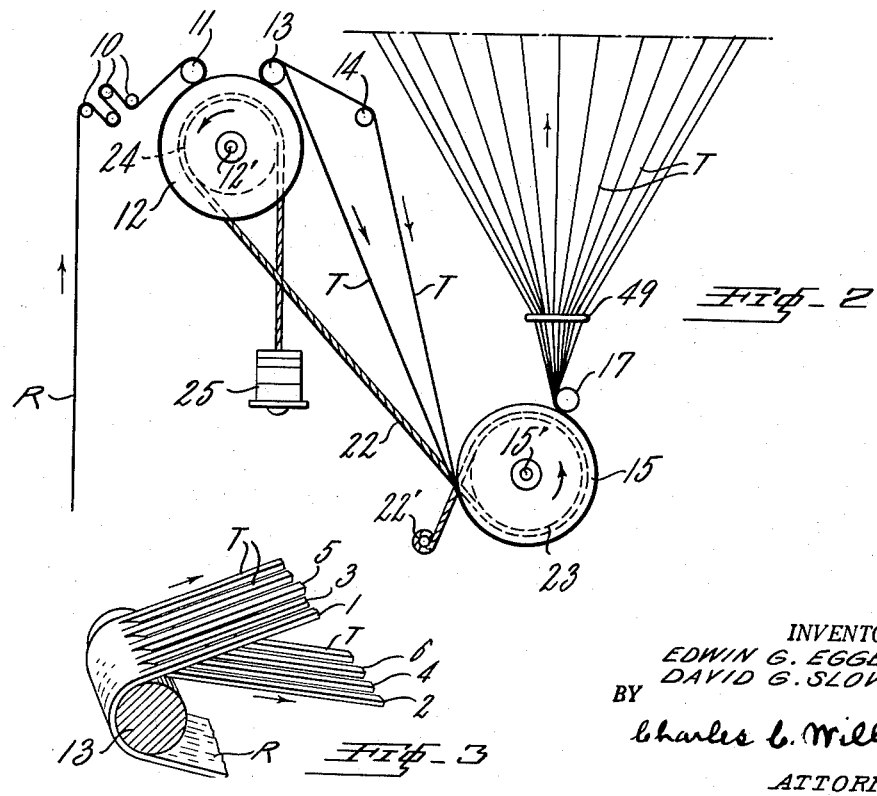
INVENTORS
EDWIN G. EGGE
DAVID G. SLOVIN
BY
Charles C. Willson
ATTORNEY

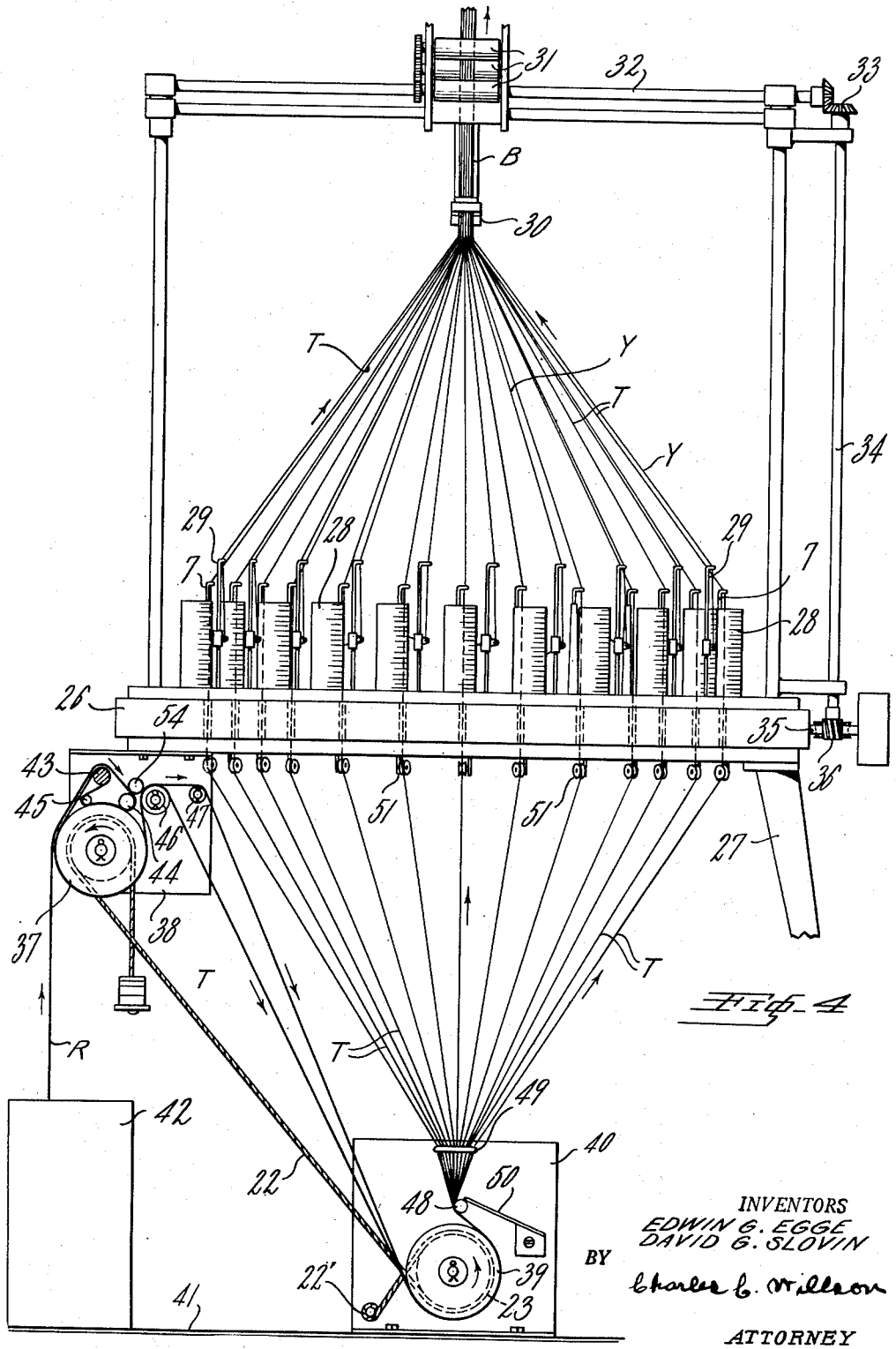

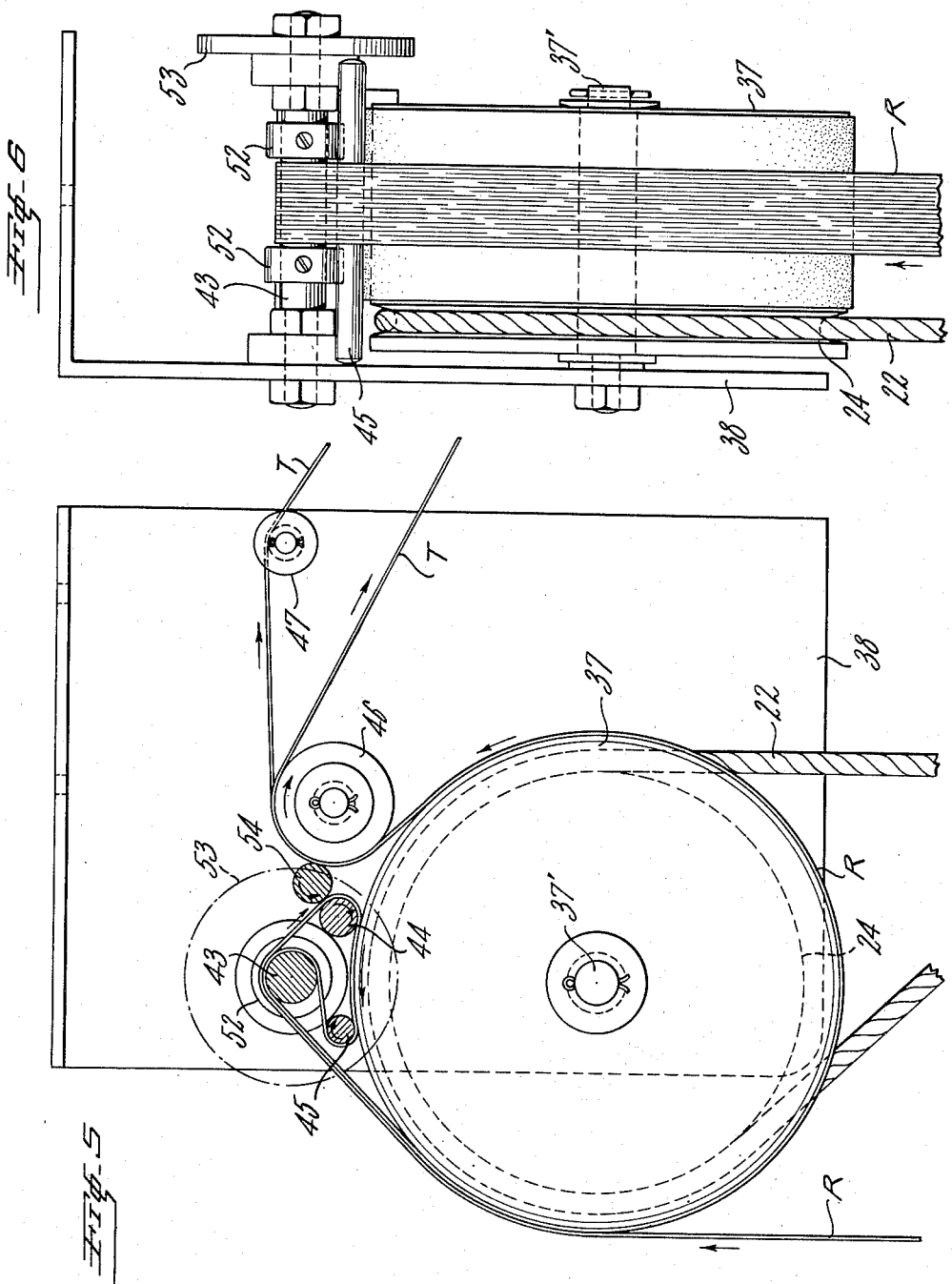

United States Patent Office 2,761,193
Patented Sept. 4, 1956

2,761,193

RIBBON RUBBER THREAD SPLITTER

Edwin G. Egge and David G. Slovin, Providence, R. I., assignors to United States Rubber Company, New York, N. Y., a corporation of New Jersey Application September 21, 1951, Serial No. 247,714

3 Claims. (Cl. 28—1)

This invention relates to apparatus for splitting a rubber ribbon or tape into its component bare rubber threads.

In supplying rubber threads to textile equipment it is found desirable, in many cases, to supply such rubber threads to the textile manufacturer in the form of a rubber ribbon or tape in which the threads are adhered together strongly enough to hold them in the ribbon formation during handling and shipment, but can be readily split out into the individual threads as they are supplied to weaving, braiding or textile equipment.

Such ribbon of rubber threads may be formed of cut rubber threads slightly bonded together as disclosed in the Hazell patent No. 2,323,132, or the ribbon may be formed of extruded latex threads slightly adhered together as disclosed in the Slovin application Serial No. 235,541 filed July 6, 1951, now Patent No. 2,678,676, for Ribbon Formed of Rubber Threads and Method of Making Same. The ribbon may also be otherwise formed.

It has been proposed heretofore to supply a ribbon of slightly bonded rubber threads to a loom, braiding machines or other textile equipment and to employ a comb to separate the threads of the ribbon as they are pulled forward by the textile equipment, but the teeth of the comb tend to chafe the rubber threads and cause thread breakage. It has also been proposed heretofore to employ power driven nip rolls or feed rolls to advance the ribbon of threads towards the textile equipment and to employ such rolls to control the tension upon the threads during the splitting operation. While such power driven rolls give good control of the tension of the ribbon and threads during the splitting operation, such equipment is somewhat expensive and its price becomes a serious matter if large numbers of braiders or other textile equipment are to be equipped with these power driven splitting-out devices.

Having in mind the foregoing, the present invention contemplates a simple, efficient and inexpensive thread splitting-out apparatus which does not require to be power driven, and is operated solely by the pull exerted on the rubber threads as they are drawn forward by the textile equipment. This thread splitter can be readily mounted adjacent a braiding machine, loom, take-up beam or other textile equipment that is to be supplied with the split-out threads and operated by the forward pull upon the threads.

One important feature of the splitting-out apparatus of the present invention resides in its simplicity of construction and low cost, due to the fact that it does not need to be geared to the textile equipment. Another important feature resides in the construction whereby the threads forming the ribbon are split apart without being chafed or otherwise damaged. Another important feature resides in the construction whereby a predetermined tension is applied to the ribbon by a brake retarded drum as the ribbon approaches the splitting-out point, and a further tension is applied to the threads by a similar drum as the threads are drawn away from the splitting-out point. These drums supply the desired tension upon the threads, and the use of the two brake retarded drums with the splitting-out point between them causes the threads to split apart, while they are subjected to only part of the total tension.

The above and other features of the present invention will be further understood from the following description when read in connection with the accompanying drawings which illustrate different embodiments of the invention.

In the drawings:

Fig. 1 is a side elevation showing somewhat schematically one form of thread splitting-out apparatus;

Fig. 2 is a similar view showing a slightly different form of such apparatus;

Fig. 3 is an enlarged perspective view showing how the ribbon is split into the individual threads;

Fig. 4 is a side elevation of a well known type of braiding machine shown equipped with a further modification of the splitting-out apparatus of the present invention;

Fig. 5 on a larger scale is a side elevation of part of the splitting-out device shown in Fig. 4; and Fig. 6 is a face view of the apparatus shown in Fig. 5 viewed from the left side of the apparatus of Fig. 5.

The present invention may be given various embodiments and that shown in Fig. 1 will now be described. In this view the ribbon R formed of cut or extruded bare rubber threads slightly bonded together may be supplied to the splitting-out apparatus from a spool, carton or other source of supply, not shown in this figure but shown in Fig. 4. As the ribbon R approaches the splitting-out mechanism sufficient tension should be exerted on the ribbon to stretch it to some degree. One simple form of tensioning means which may be employed resides in the pins 10 secured in fixed relation to each other so that the ribbon is required to travel along a zig-zag path as it slips around these pins. The ribbon then passes around a roller 11 the weight of which preferably is supported by the upper curved surface of a relatively large drum 12 that rotates on a fixed shaft 12'. The arrangement is such that the ribbon R may be looped around the major portion of this drum 12, and then pass around a second roller 13 similar to the roller 11 and the weight of which is also supported by the drum 12. The purpose of the rollers 11 and 13 is to retain the ribbon looped about the drum 12 in non-slipping engagement therewith. The drum 12 may be formed of wood, plastic or other desired material, and its surface is preferably covered with rubber so as to prevent slippage between its surface and the ribbon R. The splitting-out operation occurs, in the construction shown, adjacent the surface of the roller 13. This is accomplished by causing, for example, the even numbered threads such as 2, 4, 6 etc. (see Fig. 3) to travel in a straight path, and the odd numbered threads 1, 3, 5 etc. to travel along a bent path. The odd threads are deflected from a straight path by causing them to pass around a roller 14 which is laterally spaced from said straight path. This causes the threads to travel along two angularly disposed runs toward a second thread tensing drum 15 as shown in the drawing. Both of these drums are preferably rubber covered to prevent slippage.

If the rubber threads are to be supplied to a textile machine, such as a braider, under high tension, it is desirable to split the threads apart before they are subjected to such high tension as this will reduce the tendency of the threads to break at the splitting-out point. On the other hand the threads wil not split apart properly unless subjected to considerable tension at this time. The drums 12 and 15 give accurate control of the tension of the threads during the splitting-out operation and as these threads reach the textile machine. To this end the thread tensioning drum 15 is rotatably mounted on the fixed shaft 15' and is similar in construction and operation to the drum 12. The threads T are retained in non-slipping engagement with a major portion of the drum surface by causing them to pass around a roller 16 to engage the drum surface and around the drum to a second roller 17 to pass upwardly therefrom.

The rotation of the drum 12 and of the drum 15 is retarded the desired amount by suitable braking means, and the total braking force on the two drums should stretch the threads to the tension at which they are supplied to the textile machine. The drum 15 is preferably subject to greater braking action than the drum 12 so that the threads will be subjected to only a moderate tension while they are being pulled apart. In the construction of Fig. 1 each drum is provided with a grooved pulley 18 rigidly secured to the drum and about which a braking rope 19 is looped. One end of this rope is anchored to a fixed post 20 and the other end support several weights 21. It will be noted that the braking rope 19 for the drum 12 is provided with fewer weights than the braking rope 19 for the drum 15 so that the latter will be harder to rotate than the former.

Now referring to the construction of Fig. 2, which differs only slightly from that shown in Fig. 1, it will be seen that in Fig. 2, the ribbon R is tensioned by pins 10 and passes around the ribbon retarding drum 12 as in Fig. 1, but that the thread tensioning drum 15 is located a substantial distance below the drum 12 and not on nearly the same level as the drum 12. This construction of Fig. 2 makes unnecessary the guide roller 16 of Fig. 1, and the threads T are shown as passing downwardly into tangential contact with the side wall of the drum 15. They then pass about this drum and upwardly around the guide roller 17 as in Fig. 1. The braking mechanism shown in Fig. 2 differs somewhat from that of Fig. 1 in that a single braking rope 22 is employed and this rope has one end anchored to a fixed pin 22'. It is then looped around a braking pulley 23 which is rigidly secured to the drum 15. The rope upon leaving the pulley 23 passes upwardly and around a braking pulley 24 that is rigidly secured to the drum 12. The free end of the rope 22 has a number of weights 25 suspended thereupon. As a result of this construction, one braking rope serves to apply the desired amount of braking action upon both drums, and more braking action can be exerted upon one drum than the other by providing a larger braking pulley upon one drum than the other.

The present invention may be employed to supply bare rubber threads to a loom beam, narrow wear loom, braiding machine, or other textile equipment, but it is particularly well adapted for use in connection with braiding machines such as are employed to manufacture large quantities of narrow elastic webbing and which deliver rubber threads to the braiding point under high tension. The number of such braiding machines in use in this country is very large and if these braiding machines are to be supplied with rubber thread in ribbon form it is important to provide a simple, practical and inexpensive type of splitting-out device that can be readily installed adjacent such braiding machines.

Fig. 4 shows a conventional type of braiding machine used to produce narrow elastic webbing or tape and this braiding machine has associated therewith a preferred type of splitting-out device that differs somewhat from that shown in Figs. 1 or 2, but which employs the fundamentals of the splitting-out device of Figs. 1 and 2.

In this construction of Fig. 4 there is shown the usual type of waltzing braider having the machine bed or table 26 which is supported at the desired height from the floor by the legs 27. The upper face of this table is provided with the usual sinuous grooves, not shown, but which serve to guide the conventional carriers, each of which is provided with an upright spindle to support a spool or yarn package 28, and each carriage has extending upwardly therefrom adjacent the yarn package 28 a thread guide post 29. The arrangement is such that as the yarn unwinds from the yarn package 28 it passes laterally to this post and then upwardly to a guide eye at the upper end of the post. These textile yarns Y then pass upwardly in a converging direction to the former 30, near which they are interlocked with the rubber threads T to form the elastic braid B which is drawn upwardly by power driven feed rolls 31 that operate in the usual manner. These feed rolls are supported by the structure shown and are driven by the horizontally extending shaft 32 that is connected by the bevel gears 33 to an upright shaft 34 that is driven from the main operating shaft 35 by a worm gear 36. The braiding machine is also provided with the conventional fixed posts 7 about which the carriers waltz, and each of these fixed posts 7 is supplied with a rubber thread T which passes upwardly through a hole in the table 26 to a guide eye at the upper end of the post, then these rubber threads pass upwardly in a converging manner to the former 30 to produce the elastic braid B.

In this construction of Fig. 4 the splitting-out device has a shaft 37' carrying the ribbon retarding drum designated by 37 and associated parts mounted upon a supporting plate 38, as clearly seen in Figs. 5 and 6. This plate is secured to the machine bed. The thread retarding drum designated by 39 and associated parts are shown as mounted below the center of the braiding machine and are supported by a plate 40 which is bolted to the floor 41 upon which the braiding machine rests. The rotation of the drums 37 and 39 is retarded by the action of the braking rope 22 which engages the brake pulleys 23 and 24 as described in connection with Fig. 2 of the drawing. These drums 37 and 39 may, if desired, be mounted on one supporting frame.

The ribbon R of rubber threads is shown as drawn upwardly from a box or shipping container 42 to a stationary post 43 about which it is bent. It then passes downwardly to a free turning bar 44 disposed at one side of the vertical central plane of the drum 37 and then to a similar rotating bar 45 disposed at the other side of such plane. These bars lie in a loop of the ribbon and are supported by the rotating drum 37. These bars 44 and 45 are employed in place of the staggered pins 10 of Figs. 1 and 2 and serve to hold the ribbon R in contact with the top of the drum 37. The arrangement is such that the ribbon passes upwardly from the supply package 42 over the fixed post 43 and then to the bar 44 above which it passes to contact the upper surface of the rotating drum 37. It then passes around the bar 45 and upwardly about the post 43, whereupon it passes downwardly in a loop about the drum 37, and as it leaves this drum it passes around a roller 46 which serves to define the splitting-out point.

One set of threads T pass downwardly in a straight path from the roller 46 to the surface of the drum 39, whereas the other set of split-out threads pass around a roller 47 and then downwardly to the drum 39. The converging runs of threads T and T pass around the drum 39 in non-slipping relation therewith. They then pass upwardly around a roller 48, and from this roller they pass through a guide ring 49. It is found desirable to provide a downwardly inclined guide plate 50 the upper edge of which rests upon the roller 48 and which serves to guide away broken threads to prevent them from wrapping around this roller 48. As the rubber threads T pass upwardly from the ring 49 in an outwardly diverging direction, each thread goes to a groove roller 51 supported below the thread guiding post 7 above described. These rollers 51 are provided to prevent the threads from chafing at the point where they are directed upwardly through or along the guiding posts 7, to form what is known as rubber warp threads about which the textile yarns Y are interlocked or braided by the waltzing action of the carriers that support the yarn packages 28.

The fixed post 43 disposed above the drum 37 is preferably provided with the guide collars 52 rigidly secured thereto and spaced to receive the ribbon R between them. These collars guide the ribbon and prevent it from shifting sidewise. They also form surfaces against which the removable bars 44 and 45 rotate, and these bars are prevented from working endwise, while they are held in place by the tension of the ribbon R, by the supporting plate 38 and by the large disk 53 mounted at the outer end of the post 43. A bar 54 similar to bar 45 is preferably laid in the position best shown in Fig. 5 where it serves to press the ribbon down and to prevent broken threads from reaching the drum 37.

In producing elastic webbing or tape on a braiding machine such as shown in Fig. 4 of the drawing it is usually considered desirable to maintain the rubber warp threads T at approximately the highest tension at which they can be used without causing excessive breakage. It is found that the two drums described produce this high tension without injuring the threads, and that breakage of the threads T is avoided by splitting-out the ribbon at a point between the two drums where the thread tension is considerably below the braiding tension. This splitting-out and tensioning device supplies the threads to the braider under approximately uniform tension.

Having thus described our invention, what we claim and desire to protect by Letters Patent is:

1. Apparatus for separating one from another the individual threads in a ribbon, which ribbon is formed of a number of bare rubber threads stuck together, including a ribbon retarding drum having means for retaining the ribbon looped about the drum through an angle of more than 180° in non-slipping engagement with the surface of said drum, a thread drum having means for holding the separated threads looped about the thread drum through an angle of more than 180° in non-slipping engagement with the surface of the thread drum, brake means for retarding the rotation of the ribbon drum and brake means for retarding the rotation of the thread drum, said brakes adjusted so that more force is required to turn the thread drum than the ribbon drum, means between the drums for deflecting alternate threads in the ribbon so that the even threads travel one path and the odd threads travel another path disposed at an acute angle to the first path to split the ribbon apart into two angularly disposed runs, and take-up means operable to pull the separated threads as the sole means employed to pull the ribbon forward from its source of supply and the threads forward and thereby split the ribbon into such threads.

2. Apparatus for separating one from another the individual threads in a ribbon, which ribbon is formed of a number of bare rubber threads stuck together, including a ribbon retarding drum having means for retaining the ribbon looped about the drum through an angle of more than 180° in non-slipping engagement with the surface of said drum, a thread drum having means for holding the separated threads looped about the thread drum through an angle of more than 180° in non-slipping engagement with the surface of the thread drum, brake means for retarding the rotation of the ribbon drum and brake means for exerting a greater retarding force on the thread drum and operable to stretch the threads between such drums, said brakes adjusted so that more force is required to turn the thread drum than the ribbon drum, a pretensioner for tensioning the ribbon before it reaches the ribbon drum, and means between the drums for deflecting alternate threads in the ribbon so that the even threads travel one path and the odd threads travel another path disposed at an acute angle to the first path to split the ribbon apart into two angularly disposed runs, and take-up means operable to pull the separated threads as the sole means employed to pull the ribbon forward from its source of supply and thereby split the ribbon into such threads.

3. Apparatus in accordance with claim 2 wherein the means for maintaining the ribbon and threads looped about the ribbon drum and thread drum respectively each comprise two pins closely spaced about the surface of the drum and supported by the drum surface whereby the ribbon and threads may be led about a first of said pins, then looped substantially entirely about the drum and led about a second of said pins to be held in non-slipping engagement with the surface of the drum.

References Cited in the file of this patent

UNITED STATES PATENTS

| | | |
|---|---|---|
| 2,013,211 | Herkeberg | Sept. 3, 1935 |
| 2,169,886 | Shaw | Aug. 15, 1939 |
| 2,346,195 | Spalding | Apr. 11, 1944 |
| 2,380,373 | Alderfer | July 31, 1945 |
| 2,452,228 | Dawes et al. | Oct. 26, 1948 |
| 2,499,888 | Taylor | Mar. 7, 1950 |
| 2,501,413 | Schiappa | Mar. 21, 1950 |
| 2,654,936 | Slovin | Oct. 13, 1953 |